(12) United States Patent
Ranns et al.

(10) Patent No.: US 12,206,584 B1
(45) Date of Patent: Jan. 21, 2025

(54) METHOD AND SYSTEM FOR FILTERING DATA PACKETS TO PREVENT CROSSTALK

(71) Applicant: GRAPHIANT, INC., Fremont, CA (US)

(72) Inventors: Neale Ranns, Hure (FR); IJsbrand Wijnands, Leuven (BE); Stefan Olofsson, Dubai (AE)

(73) Assignee: GRAPHIANT, INC., Fremont, CA (US)

( * ) Notice: Subject to any disclaimer, the term of this patent is extended or adjusted under 35 U.S.C. 154(b) by 0 days.

(21) Appl. No.: 17/534,966

(22) Filed: Nov. 24, 2021

(51) Int. Cl.
*H04L 47/17* (2022.01)
*H04L 47/11* (2022.01)
*H04L 47/70* (2022.01)
*H04L 69/22* (2022.01)

(52) U.S. Cl.
CPC .............. *H04L 47/17* (2013.01); *H04L 47/11* (2013.01); *H04L 47/825* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 2006/0117058 A1* | 6/2006 | Smith | ................... | H04L 63/105 707/999.102 |
| 2010/0325701 A1* | 12/2010 | Sun | ......................... | H04L 63/08 726/4 |
| 2017/0237656 A1* | 8/2017 | Gage | ................... | H04L 61/2521 370/392 |
| 2017/0366616 A1* | 12/2017 | Rodrigues Nascimento | | ............... H04W 4/44 |
| 2018/0102970 A1* | 4/2018 | Pan | ...................... | H04L 65/1013 |
| 2020/0213154 A1* | 7/2020 | Han | ...................... | H04L 47/125 |
| 2022/0107802 A1* | 4/2022 | Rao | ......................... | G06F 16/907 |

OTHER PUBLICATIONS

Uriarte et al., "Expressive Policy-Based Access Control for Resource-Constrained Devices", Mar. 2, 2018, IEEE, IEEE Access (vol. 6, 2018, pp. 15-46) (Year: 2018).*

* cited by examiner

*Primary Examiner* — Davoud A Zand
(74) *Attorney, Agent, or Firm* — Maschoff Brennan (57) ABSTRACT

Embodiments of a secure communication network are disclosed. To implement the embodiments, an ingress core node that includes a processor and a memory storing computer-executable instructions, is presented. The instructions, when executed, cause the processor to receive a data packet. The instructions further cause the processor to compare a slice identifier (ID) associated with the received data packet with one or more slice IDs in an access control list (ACL). The instructions further cause the processor to filter the received data packet based on the comparison indicating an occurrence of a match between the slice ID associated with the data packet and one of the one or more slice IDs in the ACL. The instructions further cause the processor to transmit the filtered data packet to an egress core node of the core network via one or more intermediate core nodes of the core network.

16 Claims, 4 Drawing Sheets

METHOD AND SYSTEM FOR FILTERING DATA PACKETS TO PREVENT CROSSTALK

FIELD OF THE INVENTION

The embodiments discussed in the present disclosure are generally related to providing secure communication in networks. In particular, the embodiments discussed are related to filtering data packets in a network to prevent crosstalk.

BACKGROUND OF THE INVENTION

Existing communication networks provide secure communication between source and destination nodes in a network by setting up virtual private networks (VPNs) using Multiprotocol Label Switching (MPLS) protocol. Generally, service providers provide such VPNs for secure communication and each VPN may be shared by multiple customers of the service provider. However, a customer context for each customer is preserved in a shared VPN by using MPLS labels. Such MPLS labels are imposed by a provider edge (PE) router, which is usually owned by the service provider. However, in scenarios where the PE router is placed in customer premises, for instance, as a customer premises equipment (CPE), there may be a possibility of a third-party attack at the CPE due to security vulnerabilities in an enterprise network associated with the customer.

Further, if malicious data packets are injected into the VPN by a third-party attack, another CPE that receives the malicious data packets, may discard such data packets on detecting that the VPN or data packets are compromised. However, this may still cause expenditure of computational resources to decrypt the malicious data packets.

Therefore, there is a need for providing a more resource efficient and secure mechanism for communication of data packets.

SUMMARY OF THE INVENTION

Embodiments of an ingress core node and a corresponding method for secure transfer of data packets, are disclosed that address at least some of the above challenges and issues.

In accordance with the embodiments of this disclosure, an ingress core node is described. The ingress core node includes a processor and a memory storing computer-executable instructions that when executed, cause the processor to receive a data packet. The computer-executable instructions further cause the processor to compare a slice identifier (ID) associated with the received data packet with one or more slice IDs in an access control list (ACL). The computer-executable instructions further cause the processor to filter the received data packet based on the comparison indicating an occurrence of a match between the slice ID associated with the data packet and one of the one or more slice IDs in the ACL. The instructions further cause the processor to transmit the filtered data packet to an egress core node of the core network via one or more intermediate core nodes of the core network.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data via the established communication paths.

An "enterprise network" may refer to a network owned, leased, and/or managed by customers, which may include one or more business entities. By way of an example, the enterprise network may refer to internal network infrastructure employed by an enterprise or organization to provide connectivity among users, devices, and applications that are local to the enterprise. Various such enterprise networks located at different sites may need to be connected to each other via a core network for external communication. Therefore, an enterprise network may include one or more internal networks that are located at geographically separate sites.

The "core network" may refer to a network infrastructure that may provide services to connect one or more enterprise networks with each other. The core network represents a central or core element that provides one or more routing paths for exchange of information between different enterprise networks. The core network may facilitate high-capacity communication between different enterprise networks located at different geographical locations.

A "core node" may refer to any node within the core network, which is capable of routing data packets to another core node within the core network. The core node may include, but not limited to an access point, a router, a bridge, a server, a gateway, a switch, a modem, a relay, or a hub.

In the core network, an "ingress core node" may receive incoming data from another network such as an enterprise network. In the core network, an "egress core node" may handle outgoing data to another network. An "intermediate core node" refers to a node between the ingress core node and the egress core node in the core network. In the examples provided in this disclosure, "Cx" generally refers to core nodes (e.g., C1, C2, C3 and so on), "C1" refers to the ingress core node, C2 refers to the intermediate node, and C3 refers to the egress core node.

A "routing path" may refer to a traversal path for a given data packet in the core network. The routing path may include a number of hops from one core node to another core node, within the core network. Herein, each core node may be connected to another core node within the core network, via a "hop". Similarly, a core node may be connected to subsequent node in an enterprise network (such as a CPE) via another hop.

A service provider (SP) may refer to an entity providing, managing, and/or operating a core network, over which data is routed to and/or from one or more enterprise customers. The disclosed architecture provides a method for the SPs to provide connectivity services to the one or more enterprise customers over the core network, which is a shared core infrastructure. Non-limiting examples of SPs may include Secure Access Service Edge (SASE) providers, Network as a Service (NaaS) providers, Multiprotocol Label Switching (MPLS) Virtual Private Network (VPN) providers, and Software Defined Wide Area Network (SD-WAN) providers.

In general, the core networks and enterprise networks may include any known network infrastructure in the context of telecommunication networks. In the spirit of the ongoing disclosure, such network infrastructure may at least include one or more nodes such as, but not limited to, access points, routers, bridges, servers, gateways, switches, modems, relays, and hubs. The enterprise networks may include one or more of the above-mentioned nodes in addition to one or more customer premises equipment(s) (CPEs), which are located within the premises of the enterprise networks. The CPEs may include, but not limited to, gateways, switches, routers, network adapters, set top boxes, and so on.

An "ingress CPE" may receive data packet(s) originated from an endpoint device and perform encryption and/or encapsulation on the received data packets to create encrypted and/or encapsulated data packet(s). The ingress CPE may transmit the encrypted and/or encapsulated data packet(s) towards an "egress CPE" via the core network. The egress CPE may receive the encrypted and/or encapsulated data packet(s) from the core network and transmit these data packet(s) to an intended destination node. In this disclosure, "CPE-Ax" refers to CPEs of a customer enterprise A. For example, CPE-A1, CPE-A2, and CPE-A3 refer to CPEs for a customer enterprise A. Similarly, for a different customer B, the CPEs may be denoted by "CPE-Bx" and so on.

An "endpoint device" may be any device associated with customers, individuals, or end users. The endpoint device may be a source node and/or a destination node to transmit and/or receive data packets from customer premises equipments (CPEs) via the core network. In an embodiment, the source node may create and transmit the data packets to the destination node, via the ingress CPE, core network, and the egress CPE. The endpoint device may include, but is not limited to, a computer, a personal digital assistant (PDA), a laptop, a cellular telephone, a tablet, or any other device or network element capable of initiating or exchanging data within one or more communication networks.

Furthermore, a "data packet" refers to data or information that is packaged for transmission over a network. The data packet created by the source node may include a payload portion, a metadata portion, and one or more headers. The headers may include one or more of, but not limited to, an inner internet protocol (IP) header and an outer IP header. The payload portion may include data (e.g., customer related data) that the source node of an enterprise network may intend to transmit to the destination node of the enterprise network. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another.

"Controller X" refers to a controller for controlling and managing communication among network entities in a network. The controller X may be a dedicated controller for a particular enterprise (e.g., controller A for enterprise A, controller B for enterprise B and so on.). For instance, controller X may be a centralized managing node that may be owned and operated by enterprise A to manage communication between network nodes or CPEs owned and operated by enterprise A. Alternatively, controller X may be a multi-tenant controller for multiple tenants, customers, or enterprises. The multi-tenant controller may include logical segmentation for different customers and thus, segmentation may be maintained across different customers. In an embodiment, the controller may at least include a processor, a memory storage and one or more hardware and/or software modules, as may be required for implementing the above-described functions of the controller. In one example, the controller may be a software-defined wide area networks (SDWAN) controller, which may include but not limited, an Application Policy Infrastructure Controller (APIC), a vManage Controller, a vSmart controller, and so on.

In accordance with an embodiment, the term "slice" may refer to a group of nodes in the enterprise networks that may access a common service. Each node (e.g. source node) may communicate with other nodes (e.g. destination node) within the slice(s), in accordance with an embodiment. In one example, the source node and the destination node in an enterprise network may be part of a slice which may access communication services provided by the core network. According to the embodiments presented herein, each slice may be associated with a slice identifier (ID) and each node in the enterprise networks and the core networks may be associated with a device ID. In an embodiment, multiple nodes belonging to a slice may be associated with a corresponding (common) slice ID. Therefore, such an addressing scheme enables unique addressing of each node by a combination of device ID and slice ID for communication between the nodes in that slice.

During a set-up phase, each node is configured to implement the above-mentioned "addressing scheme", thereafter. Accordingly, the source node may be identified by the unique combination of the device ID and slice ID associated with the source node. Similarly, the destination node may be identified by the unique combination of the device ID and slice ID associated with the destination node. Further, if source and destination nodes belong to the same slice, then the corresponding slice ID will be commonly associated with both the source and destination nodes.

In this address scheme, the inner header of the data packet received by the ingress CPE, may include a source address field and a destination address field. In one example, the inner header may be an IPV6 header. The source address field may include a device ID associated with the source node and a slice ID of the slice associated with the source node (and destination nodes). The source address corresponding to the source node may be determined based on the device ID of the source node (source device ID) and the slice ID. Further, the destination address field may include a device ID of the destination node (destination device ID) and the slice ID. The destination address corresponding to the destination node may be determined based on the destination device ID and the slice ID.

In an embodiment, the disclosed approach enables creation of new slices and corresponding slice IDs that can be associated with the participating nodes. For instance, if a node in one slice intends to communicate with another node in another slice, both these nodes may be configured to become part of a new slice with a new and different slice ID. The new slice ID is shared by the two nodes and is different from the slice IDs corresponding to other slices.

An "access control list (ACL)" refers to a set of rules used for filtering data packets that may access the core network. In an embodiment, an ACL may be stored at a CPEs and/or a core node to filter an incoming data packet and route it to a subsequent node or to discard the data packet, based on a predetermined criterion, as will be described later.

For secure communication of data packets through a network, various "encapsulation" techniques defined by the IPsec standard, may be implemented to encapsulate the data packets. For instance, the deployed encapsulation techniques may include, but not limited to, an Encapsulating Security Payload (ESP) encapsulation as defined by the IPsec standard, a customized ESP encapsulation, and a generic routing encapsulation (GRE). One or more of these techniques may be implemented, either individually or in combination with each other, without departing from the scope of the ongoing description.

To further enhance the security of the data packet, one or more "encryption" techniques may also be implemented. For instance, encryption techniques such as, but not limited to, an ESP encryption as defined by the IPsec standard, a customized ESP encryption, an Advanced Encryption Standard (AES) encryption, a Data Encryption Standard (DES) encryption, and Triple-DES encryption may be implemented to encrypt the data packet.

Further, "filtering" of data packets by a core node, in the context of the embodiments presented, may mean that that the core node may filter the data packets to allow them to enter the core network. In one example, once the core node filters the data packets, it may forward the filtered data packets to another core node in the core network. In an embodiment, some other data packets may not be filtered by the core node, which may mean that the core node may "discard" such data packets, thereby, not allowing these data packets to enter the core network.

An objective of the embodiments described herein is to filter data packets at the ingress core node based on a slice ID included in each corresponding data packets. Therefore, this filtering prevents malicious data packets from accessing the core network.

Embodiments of this disclosure present a method for secure communication of a data packet. The method includes comparing, by an ingress core node of a core network, a slice ID associated with the data packet with one or more slice IDs in an access control list (ACL). The method further includes filtering, by the ingress core node, a data packet based on the comparison indicating an occurrence of a match between the slice ID associated with the data packet and one of the one or more slice IDs in the ACL. The method further includes receiving, by the ingress core node, the data packet from an ingress CPE. The method further includes, transmitting, by the ingress core node, the filtered data packet to an egress core node of the core network.

In an embodiment, the method further includes receiving, by the egress core node, the data packet and comparing another slice ID associated with the received data packet with the one or more slice IDs in the ACL. The method further includes filtering the received data packet based on the comparison indicating an occurrence of a match between the another slice ID associated with the received data packet and one of the one or more slice IDs in the ACL. The method additionally includes transmitting the filtered data packet to an egress CPE. In an embodiment, the method also includes discarding the received another data packet based on the comparison indicating a mismatch between the another slice ID and the one or more slice IDs in the ACL.

In another embodiment, the method includes receiving, by the egress core node, another data packet from another ingress CPE and comparing, by the egress core node, another slice ID associated with the another data packet to one or more other slice IDs in another ACL. The method further includes filtering, by the egress core node, the another data packet based on the comparison indicating an occurrence of match between the another slice ID and one of the one or more other slice IDs in the another ACL. The method further includes receiving, by the ingress core node, the filtered another data packet from the egress core node and transmitting, by the ingress core node, the received another data packet to another egress CPE. The method further includes discarding, by the egress core node, the received another data packet based on the comparison indicating a mismatch between the another slice ID and the one or more other slice IDs in the another ACL.

These and other embodiments of the methods and systems are described in more detail with reference to FIGS. 1-4.

Figure 1:
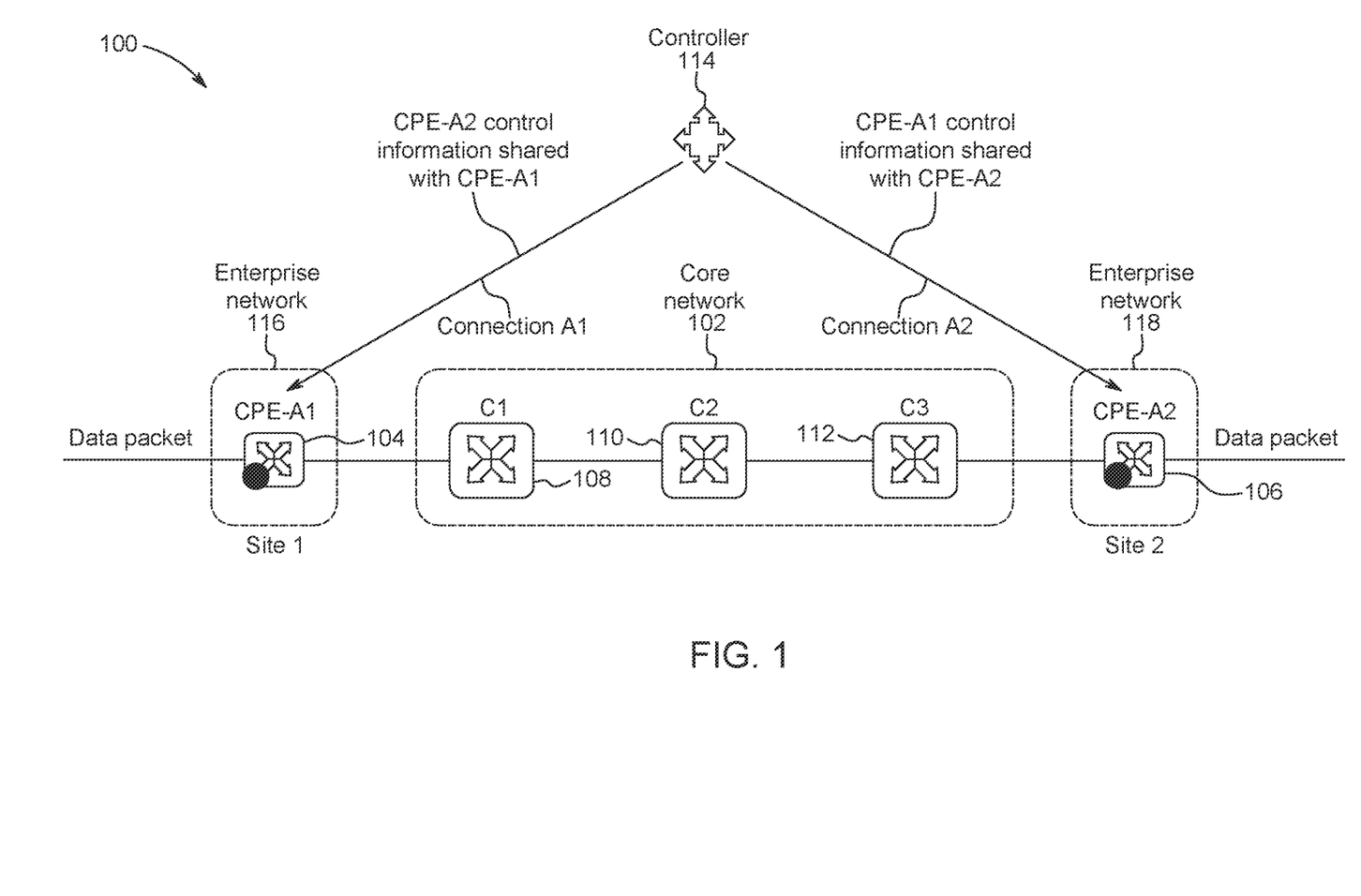
FIG. 1 illustrates a network architecture for implementing disclosed embodiments of a secure communication network, according to an embodiment.

FIG. 1 illustrates a network architecture 100, in accordance with an embodiment. In this embodiment, the network architecture 100 may include a core network 102 operated by an SP and an enterprise network 116 operated by customer A and located at site 1. The network architecture 100 may also include an enterprise network 118 operated by the customer A and located at site 2 that may be geographically separated from site 1. Further, the core network 102 may represent a network owned and/or operated by the SP to provide connectivity services to one or more customers, such as customer A depicted in FIG. 1. Further, the enterprise network 116 may communicate with the enterprise network 118 via the core network 102.

A person skilled in the art would understand that it is not necessary that the enterprise network 116 and enterprise network 118 are operated by the same customer and they may be owned by different customers as well. For example, both the enterprise networks 116 and 118 may either be different internal networks (e.g. intranets) of the same organization, at different geographical locations or they may be networks owned and operated by separate organizations, at different locations. Additionally, there can be any number of enterprise networks in the network architecture 100 and one or more of these enterprise networks may be operated by one customer while the remaining may be owned by other customers. Further, such enterprise networks may be located geographically in different locations, which may either be in proximity to each other or remotely located with respect to each other. It would be apparent to a person skilled in the art that an enterprise may include more than one enterprise networks at multiple locations. FIG. 1 merely exhibits a non-limiting example of enterprise networks 116 and 118 that are located at different geographical locations. However, any number of enterprise networks without geographical limitations, may be included herein to implement the embodiments presented herein. Other configurations and scenarios are also possible where information can be exchanged between sites of one enterprise and/or between sites of another enterprise irrespective of whether all such sites are remotely located or not with respect to each other.

Referring to FIG. 1, the core network 102 may represent backend infrastructure that may provide routing paths for exchange of information between different enterprise networks such as enterprise networks 116 and 118. In one example, the core network 102 may include one or more core nodes C1 to Cn (e.g. C1 108, C2 110, and C3 112), as described earlier in this disclosure.

In one example, the ingress CPE (e.g., CPE-A1 104) and the egress CPE (e.g., CPE-A2 106) may be a part of the enterprise network 116 and the enterprise network 118, respectively. Further, the core network 102 may communicate with the enterprise networks (e.g., 116, 118) through at least one enterprise node (e.g., CPE-A1 104 and CPE-A2 106). Thus, the core network 102 may facilitate exchange of information between enterprise networks 116 and 118.

The network architecture 100 may also include a controller 114, which may be a dedicated controller for a customer such as customer A, to facilitate communication between the enterprise nodes of enterprise networks 116 and 118 via the core network 102. For instance, based on control plane functions, the controller 114 may also facilitate establishment of a data plane that connects the enterprise networks (116, 118) for communication of data packets between these enterprise networks. Additionally, the controller 114 may also facilitate configuration of the respective CPEs (ingress CPE and egress CPE) of these enterprise networks, for communication over the data plane, as described later in this disclosure.

In an embodiment, the controller 114 may facilitate exchange of control information over a control plane between CPE-A1 104 and CPE-A2 106. The control information may include, but not limited to, routing information, slice IDs, encryption keys/security association information, and core network association information. The controller 114 may then facilitate setting up secure communication channels between various enterprise nodes such as CPE-A1 104 and CPE-A2 106 in the form of end-to-end IPsec tunnels. These tunnels may be set up to enable direct and secure communication between the enterprise nodes over the data plane.

Additionally, in accordance with the embodiments of this disclosure, the controller 114 may, establish a connection to each CPE (e.g., CPE-A1 104 and CPE-A2 106). The controller 114 may then, receive encryption keys and any slice IDs (for instance, if CPE-A1 104 and CPE-A2 106 belong to a common slice) from CPE-A1 104, and transmit them to CPE-A2 106, in accordance with an embodiment.

Further, the controller 114 may communicate (to CPE-A1 104) a label (e.g., an MPLS global label) associated with the egress core node that may be connected to CPE-A2 106. Additionally, the controller 114 may communicate another label (e.g., an MPLS link label) associated with a link (or hop) between the egress core node and CPE-A2 106. CPE-A1 104 may include these labels in the data packet transmitted to the ingress core node of the core network 102 during data plane communication. Here, the labels may be provided to the controller 114 by CPE-A1 104 and CPE-A2 106, as part of the control information exchanged over the control plane. In one example, these labels may be included by the CPE-A1 104, in the outer header of the data packet during a data plane communication. In another alternative example, the labels may be included in the metadata portion of the data packet during a data plane communication. The label associated with the egress core node facilitates determination of a routing path of the data packet in the core network 102, as will be described in more detail with reference to FIG. 2. The label associated with the link between the egress core node and CPE-A2 106 enables the egress core node to transmit the received data packets to CPE-A2 106, as will also be described with reference to FIG. 2, later in this disclosure.

Figure 2:
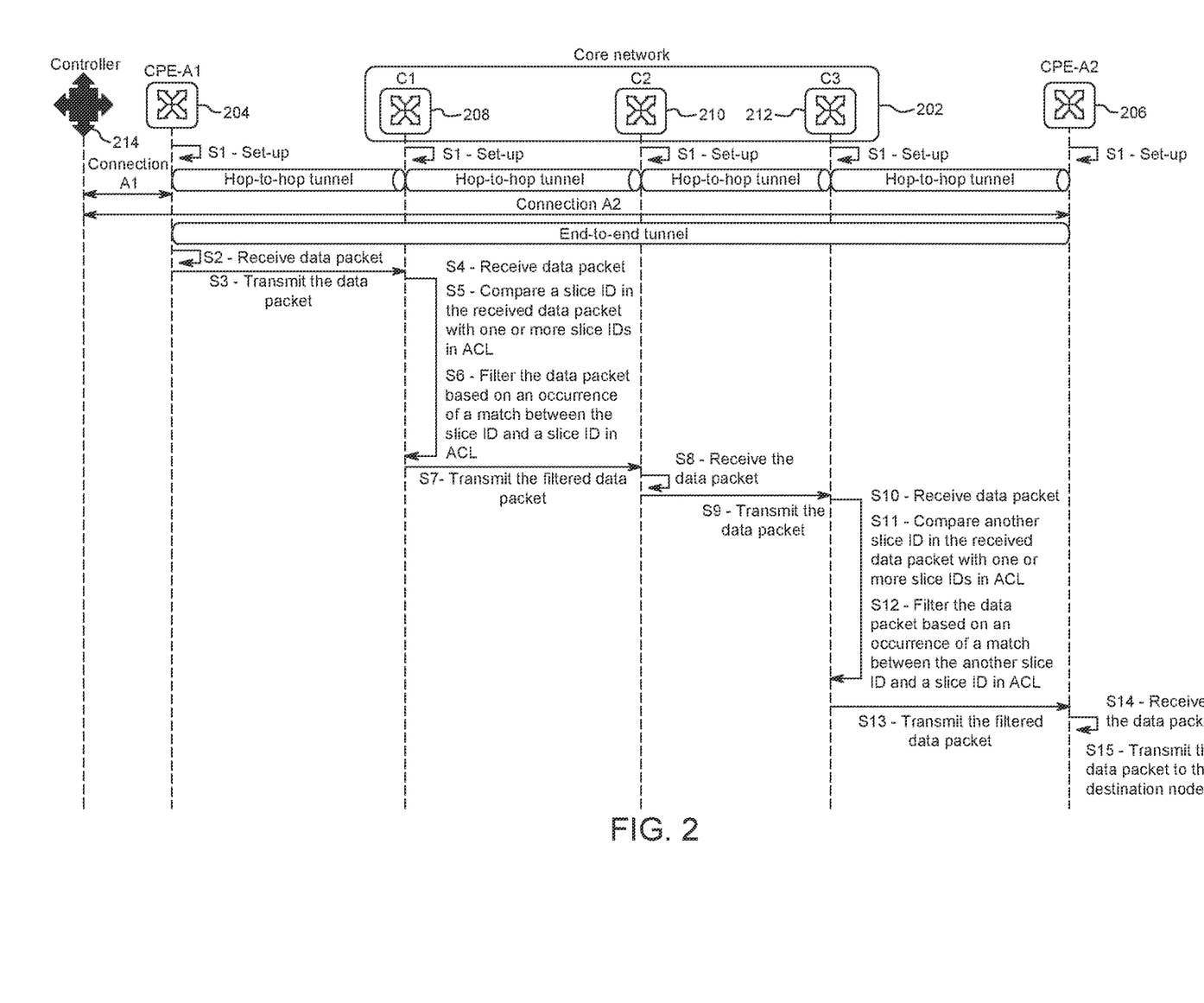
FIG. 2 is a signal flow diagram to illustrate flow of a data packet between enterprise nodes of enterprise networks, according to an embodiment.

FIG. 2 is a signal flow diagram to illustrate the flow of a data packet between enterprise nodes of the enterprise networks (e.g. 116 and 118), in accordance with an embodiment. Herein, CPE-A1 204 may be similar or equivalent to CPE-A1 104 and CPE-A2 206 may be similar or equivalent to CPE-A2 106 in its functionality and configurations. CPE-A1 204 and CPE-A2 206 may be connected to a controller 214 (which may be similar in functioning to controller 114) via connections A1 and A2, respectively.

Step S1 of the illustrated method in FIG. 2, may include a "set-up phase", in which, all nodes in an enterprise network and the core network 202 may be configured to implement the subsequent steps described later in the context of this figure. In addition, all these nodes may also be configured to implement the addressing scheme as described earlier. Further, one or more core nodes may be programmed to store a corresponding ACL and implement one or more rules included in the corresponding ACL, as will be described later in this disclosure.

Additionally, in the set-up phase, all nodes in the enterprise network and the core network may be configured to establish connections with other nodes to implement the steps of the illustrated method, as described later.

In step S2, CPE-A1 204 may receive a data packet from a source node in the enterprise network 116 as part of the data plane communication. In one example, the inner header may correspond to IPv6 header and the outer header may correspond to IPv4 header. However, a person skilled in the art would understand that both inner and outer headers may include either of IPv4 or IPv6 headers. In an embodiment, CPE-A1 204 may include the label associated with the egress core node (i.e., C3 212) and another label associated with the link between C3 212 and CPE-A2 206, in the outer header of the data packet for subsequent routing path determination.

In step S3, CPE-A1 204 may transmit the data packet to C1 208 via known transmission methods.

In step S4, C1 208 may receive the data packet from the CPE-A1 204. In an embodiment, C1 208 may, on receiving the data packet access a slice ID included in the inner header of the data packet. In one example, this slice ID may correspond to a slice associated with the source node that transmitted the data packet. This enables C1 208 to identify a corresponding slice associated with each customer that may be transmitting data packets to C1 208.

In accordance with the embodiments presented herein, this may enable C1 208 to control whether incoming data packets from one enterprise node (e.g. CPE-A1 204) should be transmitted to another enterprise node (e.g. CPE-A2 206). This may prevent any malicious data packets transmitted by a compromised enterprise node (e.g. CPE-A1 204) to another node (e.g. CPE-A2 206) through the core network (e.g. core network 202), thereby, preventing unintended crosstalk between customers. This aspect will be described in more detail later in this disclosure.

In step S5, C1 208 may compare the slice ID included in the data packet with one or slice IDs included in an ACL that is stored in C1 208. In an embodiment, C1 208 may be programmed (during the set-up phase) to store the corresponding ACL and implement one or more rules included in the ACL, as described in the context of step S1. In an embodiment, the step of comparing includes determining, by C1 208, whether a match occurs between the slice ID (e.g. slice ID of the source node) associated with the received data packet and one of the one or more slice IDs included in the ACL.

In step S6, C1 208 may filter the data packet based on the comparison indicating an occurrence of a match between the slice ID associated with the data packet and one of the one or more slice IDs included in the ACL. If the slice ID associated with the data packet matches with slice IDs included in the ACL, C1 208 may allow the data packet for its entry into the core network 202. This implies that since the slice ID is included in the ACL, enterprise nodes of the corresponding slice may be allowed to access the core network 202.

A person skilled in the art would understand that the embodiments presented herein are not limited to comparing one slice ID with the slice IDs included in the ACL. In an embodiment, C1 208 may compare an aggregation of slice IDs, that is, multiple slice IDs associated with one or more received data packets, with another aggregation of slice IDs included in the ACL. In this embodiment, C1 208 may allow any incoming data packet(s) to enter the core network if the comparison indicates a match between the aggregation of slice IDs and the slice IDs in the ACL.

In yet another embodiment, C1 208 may implement an additional criterion along with matching the slice ID(s), to filter incoming data packets. For instance, the additional criterion may include filtering incoming data packets based on a traffic class of incoming data packets, such as, but not limited to, a unicast and a multicast data packet. Here, C1 208 may have been configured during the set-up phase to store a rule or policy in the ACL, which may indicate that a specific traffic class should be prioritized for filtering. In one example, if the stored rule indicates that multicast data packets should be prioritized over other traffic classes, C1 208 may only allow multicast data packets to enter the core network 202 and discard or delay unicast (or any other traffic class of) data packets.

In one example, once C1 208 determines that the match occurs between the slice ID of the data packet and a slice ID in the ACL, C1 208 may then determine whether a destination IP address included in the data packet is a unicast address or a multicast address to determine the traffic class of the data packet. C1 208 may subsequently, allow or discard the data packet based on its traffic class. In one example, C1 208 may implement a 'Differentiated Services Code Point' (DSCP) and/or any known architecture or algorithm to filter the data packet based on the traffic class.

However, if the comparison indicates that there is no match between the slice ID associated with the data packet and the one or more slice IDs included in the ACL, C1 208 may discard the data packet instead of allowing it to enter the core network 202. This may be because if a slice ID is not known to C1 208 and is not a part of the stored ACL, C1 208 may not allow enterprise nodes associated with the corresponding slice to access the core network.

In an embodiment, the ACL may also include an indication that one or more of the one or more stored slice IDs in the ACL are compromised. In one example, this indication may have been programmed in the ACL in the set-up phase (step S1). In another example, C1 208 may have previously detected a compromised slice ID as a consequence of an integrity check failure of a previously received data packet. C1 208 may have additionally detected that a slice ID in the data packet does not match any slice ID in the ACL stored in C1 208. C1 208 may accordingly store the indication in its ACL along with the compromised slice IDs, to prevent allowing data packets including the compromised slice ID, from entering the core network 202. In yet another example, another core node may have notified C1 208 about compromised enterprise nodes or slices. In this example, each core node in the core network 202 may periodically communicate with other core nodes in the core network 202 to notify them about the compromised slice IDs detected by the corresponding core node. The frequency of communication among the core nodes may be configured in each node, in the set-up phase. Once a core node becomes aware of the compromised slice IDs, the core node may include a list of such compromised slice IDs in its ACL for preventing reception of data packets including these compromised slice IDs, in accordance with the embodiments presented herein.

In all the above examples, C1 208 may discard malicious data packets, when they are received from such enterprise nodes or slices. Therefore, C1 208 may prevent such malicious data packets from entering the core network 202. Therefore, the presented embodiments may enhance the security of the core network 202 and prevent expenditure of computational resources for processing malicious data packets by the core nodes as well as enterprise nodes that receive such data packets.

In step S7, C1 208 may transmit the filtered data packet towards C3 212 (egress core node) via one or more intermediate core nodes such as C2 210.

A person skilled in the art would understand that the illustrated number of core nodes are merely for exemplary purposes and the core network 202 may include any number of core nodes. In one example, the core network 202 may include several core nodes. All the core nodes may be inter-connected to form a mesh network, such that several routing paths from the ingress core node to the egress core node may be feasible to traverse the data packet through the core network 202.

In step S8, C2 210 may receive the data packet from the ingress core node C1 208. Once C2 210 receives the data packet, it may access the headers of the received data packet and accordingly, determine a routing path for transmission of the data packet.

In step S9, C2 210 may transmit the data packet to C3 212, which may subsequently receive the data packet, in step S10. In an embodiment, C3 212 may be programmed (during the set-up phase) to store a similar ACL as stored in C1 208 and implement one or more rules included in the ACL. However, a person skilled in the art would understand that C3 212 may store any number of ACLs, which may or may not be similar to the ACL(s) stored at C1 208.

In step S11, C1 208 may compare another slice ID included in the data packet with one or slice IDs included in an ACL stored in C3 212. For instance, C3 212 may compare a slice ID associated with the destination node with one or more slice IDs in the stored ACL. In this embodiment, this step of comparing to determining a match between the slice ID included in the data packet and a slice ID in the ACL may be performed in a similar manner as described earlier in the context of step S5. If C3 212 determines an occurrence of a match between this slice ID in the data packet and one of one or more slice IDs in the ACL, C3 212 may filter the data packet in step S12, that is, allow the data packet to be subsequently transmitted to CPE-A2 206. However, in case of a mismatch, C3 212 may discard the data packet and restrict it from being transmitted to CPE-A2 206.

Subsequently, in step S13, C3 212 may transmit the filtered data packet to CPE-A2 206 based on the label associated with the link between C3 212 and CPE A2 206.

In accordance with the above-described embodiments, C1 208 may filter a data packet based on the slice ID associated with the source node while C3 212 may further filter the data packet based on the slice ID associated with the destination node. This may be advantageous because it provides an increased scalability in the core network 202 by enabling C3 212 to implement additional filtering capability, thereby, reducing the computational burden for filtering data packets, on C1 208. In alternate embodiment, however, C1 208 may filter a data packet based on the slice ID associated with the source node as well as the slice ID associated with the destination node. In this embodiment, C3 212 need not filter the data packet but the scalability in the core network may be relatively compromised compared to the previous embodiment where both C1 208 and C3 212 filter the data packet. However, a person skilled in the art would understand that either of these embodiments may be implemented without limitation, depending on the implementation requirements.

In step S14, CPE-A2 206 may receive the data packet. Further, CPE-A2 206 may decapsulate and/or decrypt the received data packet to access the destination address included in the inner header of the data packet. In step S15, CPE-A2 206 may accordingly, transmit the data packet to the destination node based on the destination address.

A person skilled in the art would understand that there can be fewer or larger number of nodes in the core network 202 than the illustrated number of nodes. The number of nodes in FIG. 2 is merely for exemplary purposes.

The destination node may then, receive the data packet and access the payload portion of the data packet.

In an embodiment, the core network 202 may operate in either a synchronous slice mode and/or an asynchronous slice mode. In the synchronous slice mode, the core network 202 may allow one enterprise node (e.g. source node) to send data packets to and receive data packets from another enterprise node (e.g. destination node). However, in an asynchronous slice mode, the core network 202 may operate in a send-specific or a receive-specific mode. This implies that the core network 202 may allow one enterprise node to send data packets to another enterprise node but may not allow the enterprise node to receive the data packets from another enterprise node.

In one example of the synchronous slice mode, the ingress core node (e.g. C1 208) may allow incoming data packets from the source node to be transmitted to the destination node as well as incoming data packets from the destination node to be transmitted back to the source node. In one example of steps S2-S13 being implemented for a data packet transmission from the destination node towards the source node, C3 212 may act as an ingress node and to filter and transmit the data packet towards C1 208. Here, C1 208 may now act as an egress node for the data packet.

In an example of the asynchronous slice mode, C1 208 may allow incoming data packets from the source node to be transmitted to the destination node. However, C3 212 may discard or restrict incoming data packets transmitted from the destination node towards the source node, by implementing the method described in the context of FIG. 2.

Figure 3:
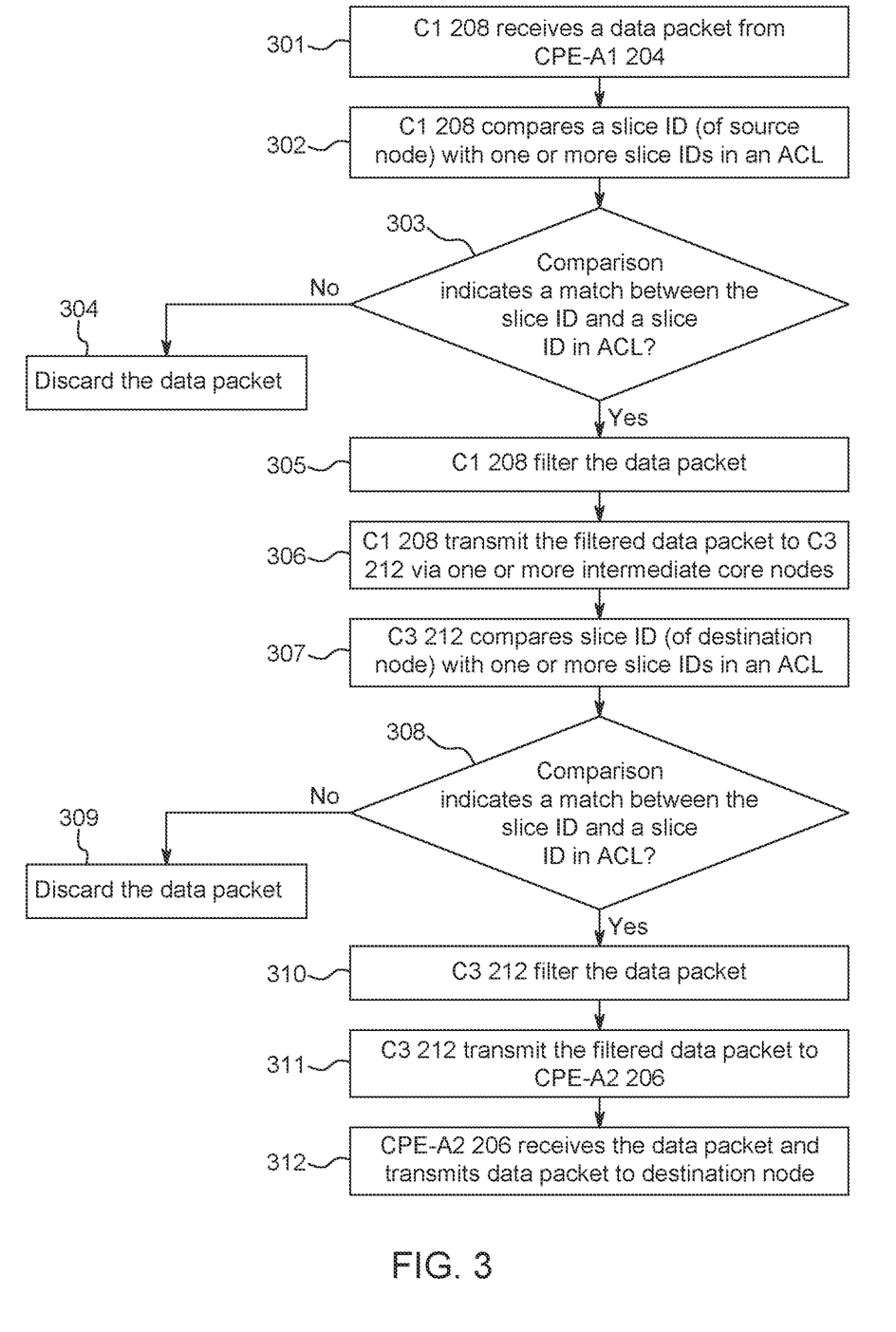
FIG. 3 is a flowchart illustrating the steps involved in communication of a data packet between enterprise nodes of enterprise networks, according to an embodiment.

FIG. 3 is a flowchart illustrating the steps involved in communication of a data packet between CPE-A1 204 and CPE-A2 206, according to an embodiment. In one example, these steps may be implemented in a communication network, such as the network architecture 100 illustrated in FIG. 1. Each step in FIG. 3 may be executed in a manner equivalent to as discussed in FIG. 2 and therefore, each step may not be described extensively again in the context of FIG. 3 for brevity.

Referring to FIG. 3, in step 301, C1 208 may receive a data packet from CPE-A1 204. In step 302, C1 208 may compare a slice ID in the received data packet with one or more slice IDs in an ACL stored in C1 208. In step 303, C1 208 may determine whether the comparison indicates a match between the slice ID (e.g. of the source node) of the data packet and a slice ID in an ACL stored in C1 208. If there is no match, C1 208 may discard the data packet in step 304. However, if the comparison indicates an occurrence of a match, C1 208 may filter the data packet for further transmission, in step 305.

In step 306, C1 208 may transmit the filtered data packet to C3 212 via one or more intermediate core nodes. In step 307, C3 212 may compare another slice ID (e.g. of the destination node) with one or more slice IDs in the ACL stored in C3 212. In step 308, C3 212 may determine whether the comparison indicates a match between the another slice ID and a slice ID in the ACL stored in C3 212. If there is no match, C3 212 may discard the data packet in step 309. However, if the comparison indicates an occurrence of a match, C3 212 may filter the data packet for further transmission, in step 310.

In step 311, C3 212 may transmit the data packet to CPE-A2 206. In step 312, CPE-A2 206 may receive the data packet and subsequently, transmit the data packet to a destination node.

In accordance with the embodiments of this disclosure, the source and destination nodes, the ingress and egress CPEs, and the core node may include at least one processor and a memory storage that may store one or more computer-executable instructions. The computer-executable instructions, when executed, may cause the processor to perform the steps as described in the context of FIGS. 2 and 3. A person skilled in the art would understand that the disclosure is in no manner restricted by the number and/or type of the processor and/or memory storage included in the core nodes. Additionally, equivalent processors and/or memory storages may also be included in any of the other entities described in the context of FIGS. 1-3 to perform any step described in the context of FIGS. 2 and 3.

Figure 4:
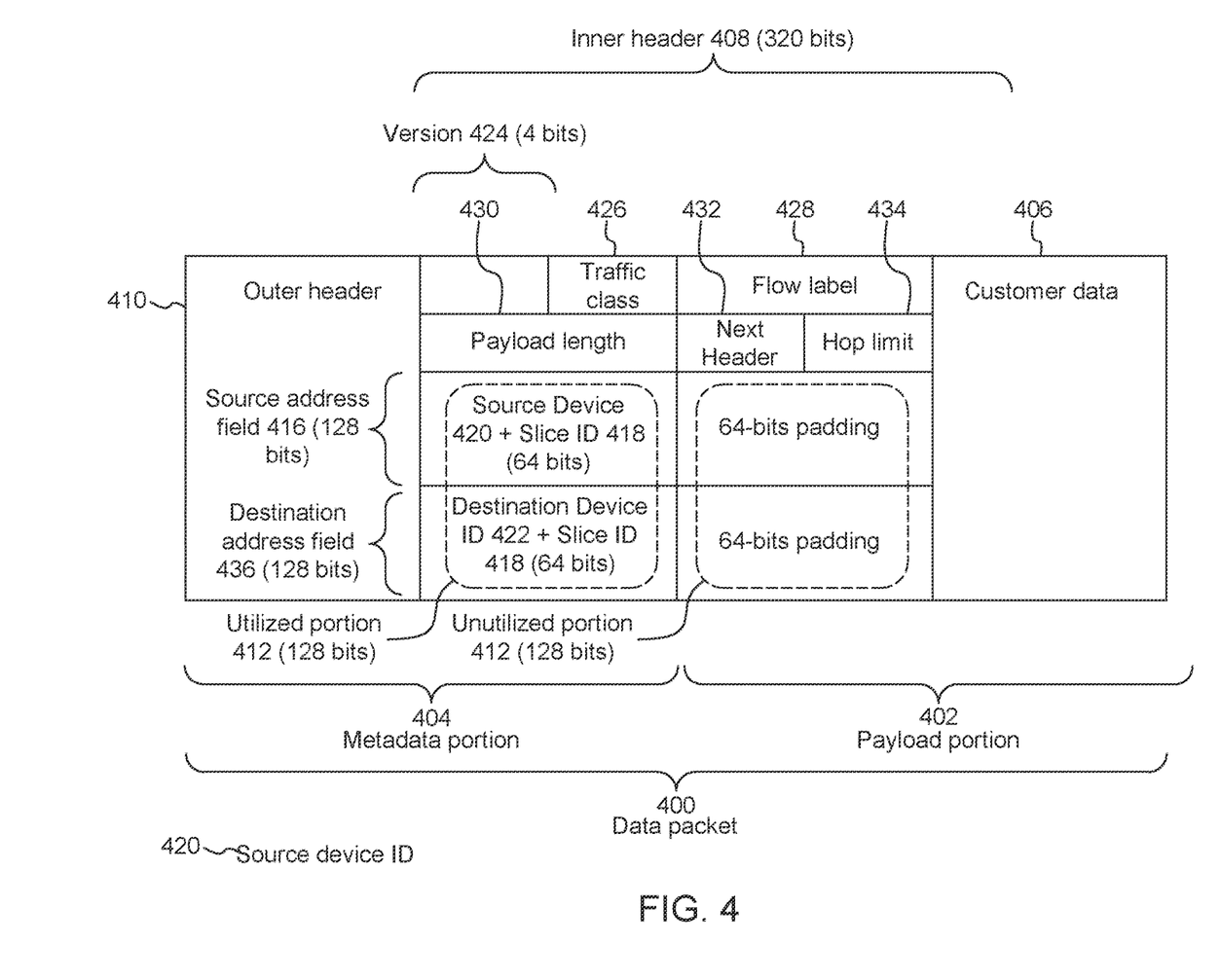
FIG. 4 illustrates an example format of a data packet, according to an embodiment.

FIG. 4 illustrates an example format of a data packet 400 received by an ingress CPE such as CPE-A1 204, in accordance with the embodiments of this disclosure. The data packet 400 may include a payload portion 402 and a metadata portion 404. The payload portion 402 may include customer data 406 that may be sensitive and/or confidential. The metadata portion 404 may include one or more headers such an inner header 408 and an outer header 410.

Here, the inner header 408 may be an IPV6 header that may include 320 bits according to the known IPv6 header format. The inner header 408 may include a 128-bit source address field 416 and a 128-bit destination address field 436, as described earlier in this disclosure. In the source address field, 64 bits may be utilized by the 32-bit source device ID 420 and the 32-bit slice ID 418. The remaining 64 bits in the source address field, may be unutilized and/or include zero-bit values (or padding). In the destination address field, 64 bits may be utilized by the 32-bit destination device ID 420 and the 32-bit slice ID 418. The remaining 64 bits of the destination address field may be unutilized and/or include padding. Therefore, the unutilized portion 414 may include 128 bits, which includes 64 unutilized bits from each of the source address filed 416 and the destination address field 436. Further, the utilized portion 412 may include 128 bits that includes source device ID 420, the destination device ID, along with the slice ID 418 that may be included twice (in both the source address field 416 and the destination address field 436).

The inner header 408 may also include a 4-bit version field 424, as described earlier. Here, the version field 424 may indicate the version of the inner header as version 6 because the illustrated inner header is uncompressed. The inner header 408 may additionally include one or more conventional header fields such as traffic class 426, flow label 428, payload length 430, next header 432, and hop limit 434.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. An ingress core node of a core network, the ingress core node comprising:
    a processor; and
    a memory storing computer-executable instructions that when executed, cause the processor to:
        compare a slice identifier (ID) associated with a data packet with one or more slice IDs in an access control list (ACL), wherein the ACL includes an indication that one or more of the one or more slice IDs in the ACL are compromised; and
        filter the data packet based on the comparison indicating an occurrence of a match between the slice ID associated with the data packet and one of the one or more slice IDs in the ACL.

2. The ingress core node of claim 1, wherein the computer-executable instructions further cause the processor to transmit the filtered data packet to an egress core node of the core network.

3. The ingress core node of claim 1, wherein the computer-executable instructions further cause the processor to receive the data packet from an ingress customer premises equipment (CPE).

4. The ingress core node of claim 2, wherein the data packet is receivable by the egress core node and further wherein, the egress core node is configured to:
    compare another slice ID associated with the received data packet with the one or more slice IDs in the ACL;
    filter the received data packet based on the comparison indicating an occurrence of a match between the another slice ID associated with the received data packet and one of the one or more slice IDs in the ACL; and
    transmit the filtered data packet to an egress customer premises equipment (CPE).

5. The ingress core node of claim 4, wherein the egress core node is further configured to discard the received data packet based on the comparison indicating a mismatch between the another slice ID and the one or more slice IDs in the ACL.

6. The ingress core node of claim 2, wherein the computer-executable instructions further cause the processor to receive another data packet from the egress core node, wherein the egress core node is configured to:

receive the another data packet from another ingress customer premises equipment (CPE);

compare another slice ID associated with the received another data packet to one or more other slice IDs in another ACL; and filter the received another data packet based on the comparison indicating an occurrence of a match between the another slice ID and one of the one or more other slice IDs.

7. The ingress core node of claim 6, wherein the computer-executable instructions further cause the processor to transmit the received another data packet to another egress CPE.

8. The ingress core node of claim 6, wherein the egress core node is further configured to discard the received another data packet based on the comparison indicating a mismatch between the another slice ID and the one or more other slice IDs in the another ACL.

9. A method for secure communication of data packets, the method comprising:

comparing, by an ingress core node of a core network, a slice identifier (ID) associated with a data packet of the data packets with one or more slice IDs in an access control list (ACL), wherein the ACL includes an indication that one or more of the one or more slice IDs in the ACL are compromised; and filtering, by the ingress core node, the data packet based on the comparison indicating an occurrence of a match between the slice ID associated with the data packet and one of the one or more slice IDs in the ACL.

10. The method of claim 9, further comprising:
transmitting, by the ingress core node, the filtered data packet to an egress core node of the core network.

11. The method of claim 9, further comprising:
receiving, by the ingress core node, the data packet from an ingress customer premises equipment (CPE).

12. The method of claim 10, further comprising:
receiving, by the egress core node, the data packet;
comparing, by the egress core node, another slice ID associated with the received data packet with the one or more slice IDs in the ACL;
filtering, by the egress core node, the received data packet based on the comparison indicating an occurrence of a match between the another slice ID associated with the received data packet and one of the one or more slice IDs in the ACL; and
transmitting, by the egress core node, the filtered data packet to an egress customer premises equipment (CPE).

13. The method of claim 12, further comprising discarding, by the egress core node, the received data packet based on the comparison indicating a mismatch between the another slice ID and the one or more slice IDs in the ACL.

14. The method of claim 11, further comprising:
receiving, by the egress core node, another data packet of the data packets from another ingress CPE;
comparing, by the egress core node, another slice ID associated with the received another data packet to one or more other slice IDs in another ACL; and
filtering, by the egress core node, the received another data packet based on the comparison indicating an occurrence of match between the another slice ID and one of the one or more other slice IDs.

15. The method of claim 14, further comprising:
receiving, by the ingress core node, the another data packet from the egress core node; and
transmitting, by the ingress core node, the received another data packet to another egress CPE.

16. The method of claim 14, further comprising:
discarding, by the egress core node, the received another data packet based on the comparison indicating a mismatch between the another slice ID and the one or more other slice IDs in the another ACL.

\* \* \* \* \*